Patented Sept. 18, 1934

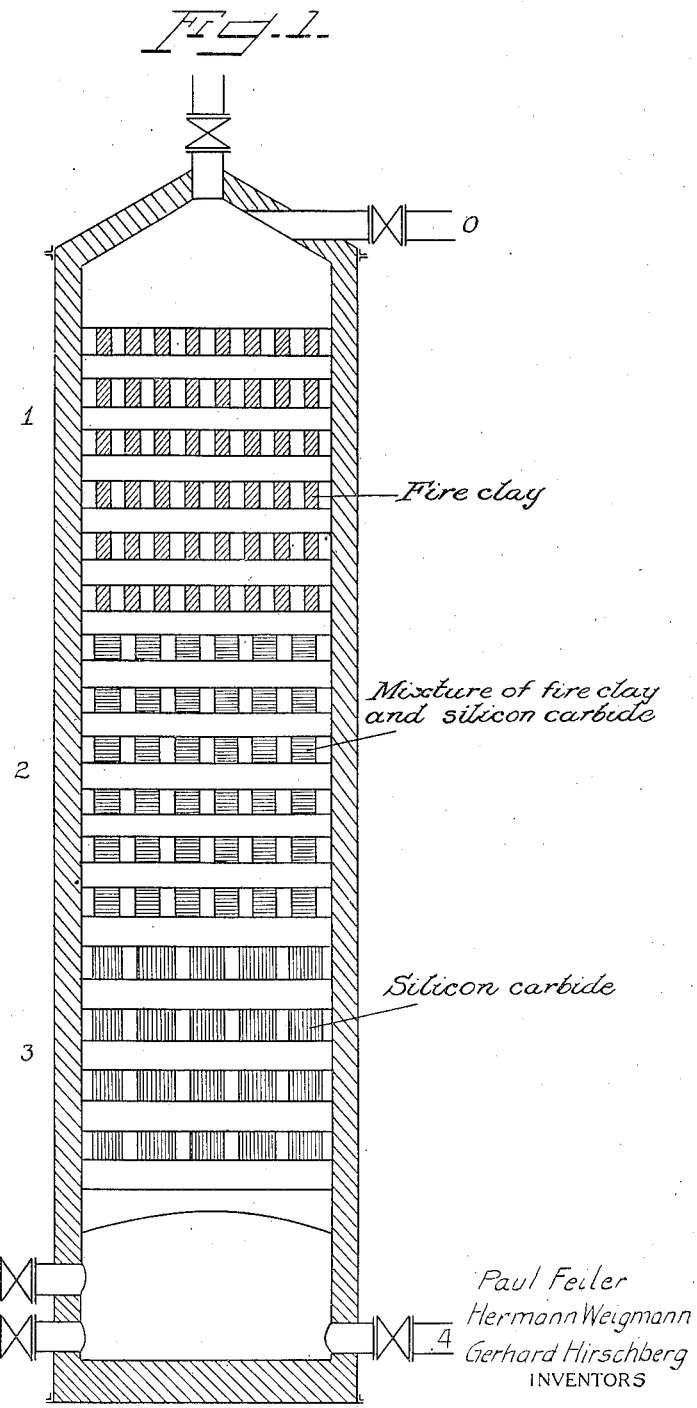

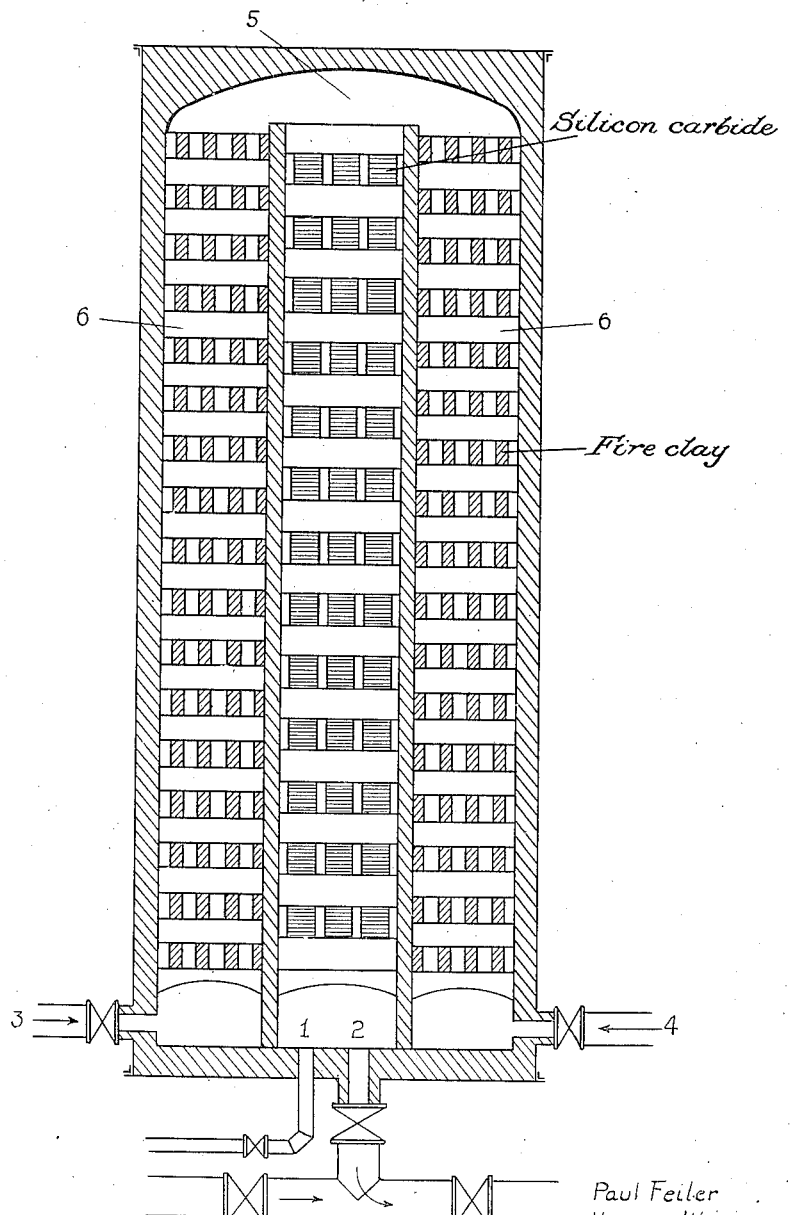

1,973,851

UNITED STATES PATENT OFFICE 1,973,851

CARRYING OUT REACTIONS IN PERIODICALLY HEATED CHAMBERS

Paul Feiler, Ludwigshafen-on-the-Rhine, and Hermann Weigmann, Mannheim, and Gerhard Hirschberg, Ludwigshafen-on-the-Rhine, Germany, assignors to I. G. Farbenindustrie Aktiengesellschaft, Frankfort - on - the - Main, Germany Application May 14, 1931, Serial No. 537,472 In Germany May 15, 1930

7 Claims. (Cl. 196—47)

The present invention relates to improvements in carrying out reactions in periodically heated chambers.

It has already been proposed to carry out reactions at elevated temperatures in periodically heated chambers which have checker bricks, which are wholly or partially constructed of catalytic material if desired. This method is especially suitable for certain endothermic reactions, for reactions which are carried out at elevated temperatures and especially for those reactions in which carbon is deposited and may give rise to stoppage of the reaction chamber. As such reactions may be mentioned, for example, the pyrogenic splitting of hydrocarbon products, such as coals, tars, mineral oils, the thermal treatment of methane and its homologues for the purpose of obtaining olefines and liquid hydrocarbons, especially aromatic hydrocarbons, the thermal treatment of gases containing olefines in order to obtain liquid hydrocarbons, especially aromatic hydrocarbons, the production of water gas from steam and coal and the catalytic conversion of methane into water gas by means of steam, which reactions are all carried out at a temperature above 300° C. An objection to this process lies in the fact that there is a temporary fall in temperature of the heat regenerator during the reaction period. The said fall in temperature results in non-uniform reaction products and worse yields than when working continuously.

We have now found that the said objection is largely avoided by taking care that the checker bricks consist wholly or partially of material, if desired catalytic material, having a greater thermal conductivity than that of the materials from fireclay and the like hitherto employed. The thermal conductivity and the size of the regenerator should be adapted to suit the different local heat requirements of the reaction. For example, when effecting a reaction requiring large amounts of heat regenerators having great thermal conductivities and consisting of large pieces should be employed. The reaction chamber may be lined in zones or in stages with materials having different thermal conductivities, as for example thermal conductivities gradually increasing in the direction of the passage of the reacting material. It is especially important that there should be large masses of particularly good thermal conducting material in the reaction zones proper per square meter, which material allows of a utilization of the stored up heat to the core of the heat transferrer during the reaction period. Thus with the same dimensions of the reaction chamber, considerably higher throughputs at a constant temperature are obtained in a given unit of time.

As filling material in the said heat generators only highly refractory materials, such as fireclay, silica and the like have hitherto been employed. The heat conductivity of these materials if measured in kilocalories per meter, per degree C. and per hour, is less than 1.5 at a temperature of 1000° C.

The refractory materials employed according to the present invention as sole or partial filling materials have a considerably greater heat conductivity than the materials hitherto employed, preferably a heat conductivity of more than 2.5. At 1000° C. the heat conductivity of silicon carbide is 11.9, that of zirconium is 1.7 and that of magnesite from 2.9 to 3.2.

The nature of the invention will be further described with reference to the accompanying drawings which illustrate diagrammatically vertical sections of heat chambers according to the invention but the invention is not restricted to the particular example shown.

The Cowper shown in Figure 1 which is 6 meters in height and which has a free cross-section of 0.33 square meter is filled in zones with three different kinds of materials. Zone 1 is filled with ordinary plates of fireclay which are 20 millimeters thick, zone 2 is filled with shaped bodies 40 millimeters thick which consist of 30 per cent of silicon carbide and 70 per cent of fireclay, and zone 3 is filled with shaped bodies which consist of 90 per cent of silicon carbide and 10 per cent of a binding agent 60 millimeters thick. The Cowper is heated so that the temperature in zone 3 is about 1200° C. and in zone 1 about 700° C., all filling bodies (even those of 60 millimeters in thickness built of silicon carbide) being uniformly heated to the core. The supply of heating gas introduced at 5 and of air introduced at 6 is then shut off and an 85 per cent methane is led in at 0. After passing the methane through the Cowper with a velocity of from 2 to 4 meters per second a mixture of gas and vapors is produced which is withdrawn at 4. The gas has the following composition: 1 per cent of carbon dioxide, 2.8 per cent of unsaturated hydrocarbons, 1 per cent of carbon monoxide, 32.2 per cent of hydrogen, 56.0 per cent of methane and 7 per cent of nitrogen. From 1 cubic meter of 85 per cent methane are furthermore obtained 45 grams of vapors which after withdrawal at 4 are condensed to a liquid condensate containing 60 per cent of benzene. By heating for 10 minutes in the apparatus constructed according to the present invention a considerably larger amount of heat is absorbed and may be made useful in the subsequent reaction than according to known processes.

Figure 2 shows an apparatus filled with two different kinds of heat-reacting materials. The centre 5, which is to be used as reaction space, is filled with shaped bodies consisting of 90 per cent silicon carbide and 10 per cent of a binding agent, the annular space 6 is filled with bodies of fireclay of much smaller shape. The heating is effected with heating gas and air introduced at 2 and 1, respectively. During the reaction period the Cowper may be supplied with homologues of methane introduced at 3 and 4. The reduction products escape at 2.

In many cases it is especially advantageous to arrange large masses of heat regenerating material having very good thermal conductivity at the ends of the reaction zone. This is especially the case in the thermal conversion of methane and its homologues into olefines and hydrocarbons of higher molecular weight, and also in the thermal conversion of gaseous olefines into other hydrocarbons, especially liquid hydrocarbons. In quite a general manner, a far reaching adaptation of the temperature ratios to the requirements of the process to be carried out may be effected by the suitable selection and arrangement of the heat regenerating materials. For example, for a process having a high speed of reaction, a material having particularly high thermal conductivity is arranged with the greatest possible aggregation of mass per square meter in the reaction zone.

Refractory bricks shaped with an addition of silicides or masses consisting of chromium nickel alloys, silicides, carbides, as for example ferrosilicon and silicon carbide, molybdenum, chromium or tungsten may for example be employed as the heat regenerating materials. Moreover, bricks which have been impregnated with catalytic metals, or salts may be employed. Different materials as regards catalytic activity may be employed in zones or stages. The process may be carried out at any temperatures and pressures.

What we claim is:

1. An apparatus suitable for carrying out a chemical reaction at an elevated temperature comprising a chamber, means for periodically heating said chamber, this chamber being filled with several layers of different checker bricks, the heat conductivities of which gradually increase in the direction of the passage of the reacting material and the heat conductivity of at least one of said layers measured in kilocalories per meter, per degree C. and per hour, is greater than 1.5 at a temperature of 1000° C. said layer being composed of a material selected from the class consisting of silicon carbide, zirconium and magnesite.

2. An apparatus suitable for carrying out a chemical reaction at an elevated temperature comprising chamber, means for periodically heating said chamber, this chamber being filled with three layers of hot checker bricks of which that with which the reacting material is to come first into contact consists of fireclay, the second of a mixture of silicon carbide and fireclay and the third of silicon carbide maintained in shape by a binding agent.

3. An apparatus suitable for carrying out a chemical reaction at an elevated temperature comprising chamber, means for periodically heating said chamber, this chamber being filled with three layers of hot checker bricks of which that with which the reacting material is to come first into contact consists of fireclay, the second of a mixture of silicon carbide and fireclay and the third of silicon carbide maintained in shape by a binding agent the pieces of the second layer being smaller than the pieces of the third layer and larger than the pieces of fireclay.

4. A process for endothermically treating a hydrocarbon gas of the methane series, which comprises passing said gas along a plurality of heated layers of checker bricks the heat conductivities of which gradually increase in substantially unbroken sequence in the direction of passage of said gas, and the heat conductivity of at least one of said layers of checker bricks, measured in kilocalories per meter, per degree C. and per hour is greater than 1.5 at a temperature of 1000° C. said checker bricks having been previously heated to the desired temperature by the burning of a combustible material in contact therewith.

5. A process for thermally treating a hydrocarbon gas of the methane series which comprises passing said gas through three layers of hot checker bricks of which that with which the said gas comes first into contact consists of fireclay, the second of a mixture of silicon carbide and fireclay and the third of silicon carbide maintained in shape by a binding agent the pieces of the second layer being smaller than the pieces of the third layer and larger than the pieces of fireclay.

6. A process for effecting an endothermic chemical conversion at an elevated temperature, which comprises passing the material to be converted along a plurality of layers of heated checker bricks the heat conductivities of which gradually increase in substantially unbroken sequence in the direction of passage of said material being converted, the heat conductivity of at least one of said layers measured in kilocalories per meter, per degree C. and per hour being greater than 1.5 at a temperature of 1000° C., said checker bricks having been previously heated to the desired temperature by the burning of a combustible material in contact therewith.

7. A process for effecting an endothermic chemical conversion at an elevated temperature, which comprises passing the material to be converted along a plurality of layers of heated checker bricks the heat conductivities of which gradually increase in substantially unbroken sequence in the direction of the passage of said material being converted, the heat conductivity of at least one of said layers, measured in kilocalories per meter, per degree C. and per hour being greater than 1.5 at a temperature of 1000° C., said checker bricks having been previously heated to the desired temperature by the burning of a combustible material in contact therewith.

PAUL FEILER.
HERMANN WEIGMANN.
GERHARD HIRSCHBERG.